May 18, 1965   J. W. HENNEMAN   3,183,917
FLUID CONTROL APPARATUS
Filed Nov. 28, 1962   2 Sheets-Sheet 1

INVENTOR.
JOHN W. HENNEMAN
BY
ATTORNEY

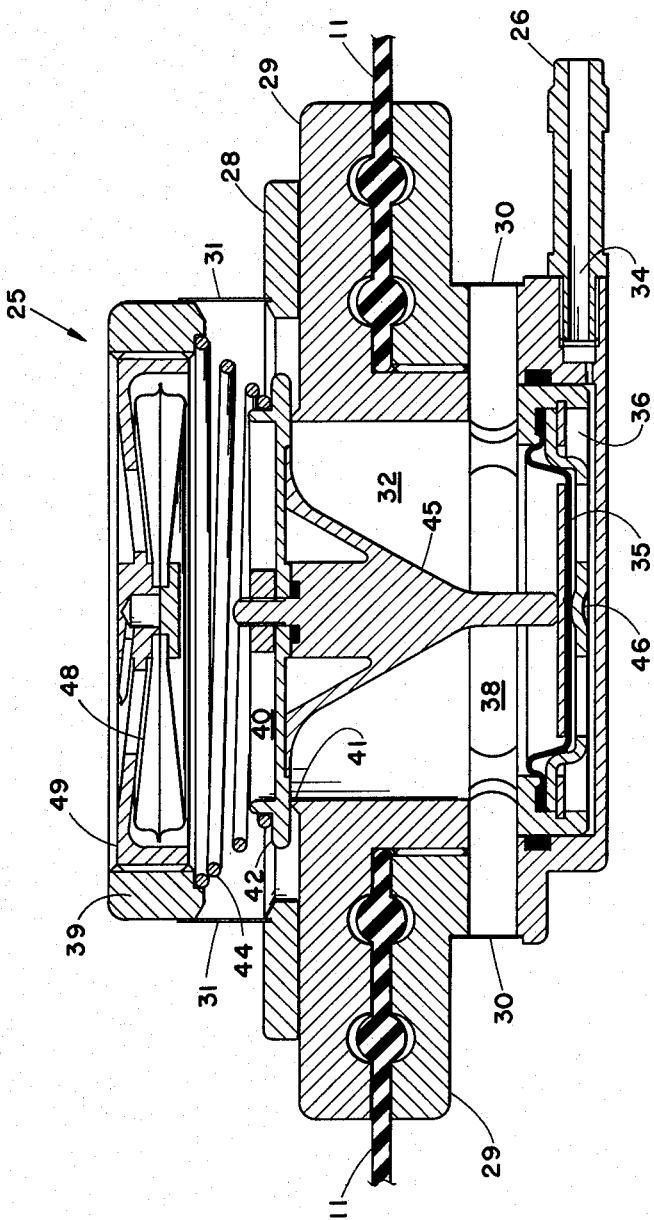

3,183,917
FLUID CONTROL APPARATUS
John W. Henneman, Rock Island, Ill., assignor to The Bendix Corporation, Davenport, Iowa, a corporation of Delaware
Filed Nov. 28, 1962, Ser. No. 240,533
4 Claims. (Cl. 137—81)

This invention relates to a fluid control apparatus and more particularly to a fluid control regulator suitable for use with a pressure garment of an aviator.

The invention has as one of its objects the provision of improved fluid control apparatus which may be used for controlling the ventilation and pressurization of an aviator's pressure garment.

The physiological demans of the human body require that an external pressure act on the body at all times. An aviator flying at high altitudes must have pressure protection for his body when he is subjected to atmospheric pressures below 3.4 p.s.i.a. (pounds per square inch absolute). This pressure is generally referred to as the critical pressure and is equivalent to the atmospheric pressure at approximately 35,000 feet altitude. One type of fluid control apparatus regulates garment pressure and the ventilation air flowing therethrough by controlling the fluid flow at the garment exhaust. This type of regulator creates an undesirable build-up of pressure in the garment as a result of the venting of ventilation air from the garment and through the regulator.

Another object of the present invention is to provide a fluid control regulator in which the fluid flowing through the valve is substantially unrestricted by the flow control elements of the valve.

A further object of the present invention is to provide a fluid control regulator wherein the pressure of the ventilating air entering the garment is utilized to control the fluid flowing through the regulator.

A still further object of the present invention is to provide a fluid control regulator wherein the means responsive to variable ambient pressure offers substantially no resistance to the fluid flowing through the regulator.

A still further object of the present invention is to provide a fluid control regulator which is small, light weight, and adjustable for mouuting on an aviator's pressure garment.

Certain of these objects are realized by the provision of valve means associated with the flow passage and responsive to pressure variations of ambient pressure and a booster pressure.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawing is for the purpose of illustration and description and is not to be construed as defining the limits of the invention.

FIG. 3 is a schematic drawing of a flow control regulator embodying the invention.

In the following detailed description and operational description, numerical values for pressure and altitude will be used to more clearly illustrate the present invention. These values should not be considered as limiting the scope of the invention because other values may be used.

Figure 1:
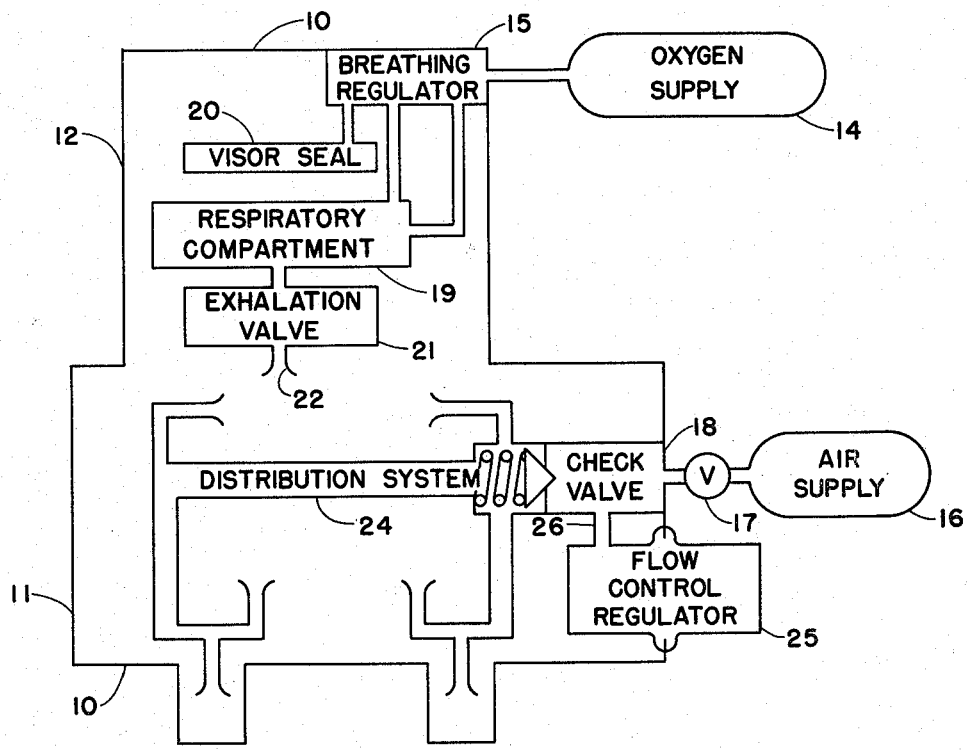
FIG. 1 is a schematic drawing showing a flow diagram of a pressure suit and helmet control system including the flow control regulator of the present invention.

Referring now to the drawings and in particular to FIG. 1, there is shown a flow diagram of an aviator's pressure suit and helmet control system wherein the numeral 10 designates a ventilation and pressure garment having a suit portion 11 and helmet portion 12. Oxygen supply 14 is in fluid communication with the oxygen inlet of breathing regulator 15 which is mounted in the helmet 12 and air supply 16 is in fluid communication with air inlet check valve 18 through manual flow control valve 17, check valve 18 is mounted in the suit 11.

Breathing regulator 15 is in fluid communication with respiratory compartment 19 and helmet visor seal 20. Exhalation valve 21 is in fluid communication with the respiratory compartment 19 and is disposed to pass exhaled gas into garment 10 by means of tubing 22. Air inlet check valve 18 is in fluid communication with the air distribution system 24 which circulates air through the garment 10. Flow control regulator 25 is mounted in the suit 11 and is disposed to pass ventilation air from the pressure garment 10 to the atmosphere. Regulator 25 is in fluid communication with air inlet check valve 18 by means of tubing 26.

Figure 2:
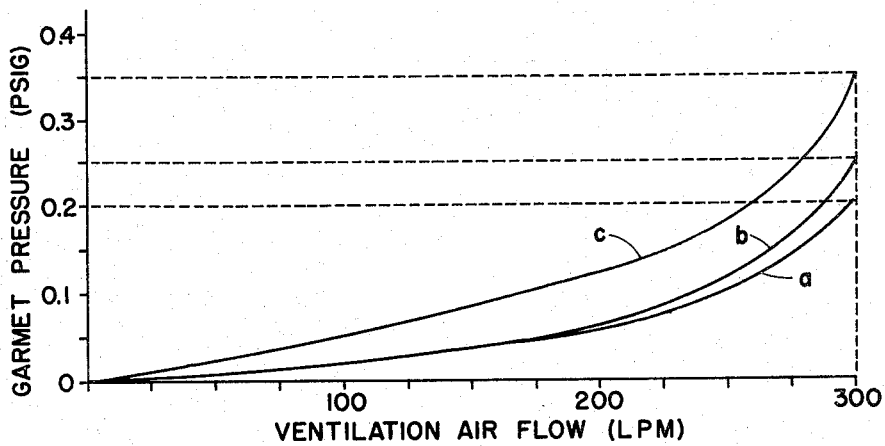
FIG. 2 is a graphic illustration of garment back pressure curves of an aviator's garment, the flow control regulator of the present invention, and of prior art regulators.

Referring now to FIGURE 2, there are shown three garment back pressure curves illustrating garment pressure in pounds per square inch gage (p.s.i.g.) versus ventilation air flow in liters per minute (l.p.m.) passing through the garment 10. It is necessary that an aviator have complete mobility while in his garment and it has been found that substantially no resistance to movement is apparent when the garment pressure is maintained below 0.2 p.s.i.g. Above 0.2 p.s.i.g. the garment material is under tension and aviator mobility is affected as each incremental increase in garment pressure causes an increase in the force to bend the material. It has also been found that the force required to bend the garment material at 0.3 p.s.i.g. is twice as great as the force required to bend the material at 0.25 p.s.i.g. and the force required at 0.35 p.s.i.g. is three times as great as at 0.25 p.s.i.g.

The back pressure curves of FIGURE 2 are illustrative of the following pressures. Curve *a* is for a typical pressure garment 10 (FIG. 1) worn by an aviator, the back pressure is created by the ventilation air after it leaves air distribution system 24 as it seeks the exhaust port of the suit. Curve *b* is for a typical pressure garment 10 (FIG. 1) and the back pressure created by flow control regulator 25 (FIG. 1). Curve *c* is for a typical pressure garment 10 (FIG. 1) and flow control regulator 25 (FIG. 1) without the use of booster pressure. Flow control regulator 25 (FIG. 1) without booster pressure creates a pressure drop substantially similar to the flow control apparatus of the prior art.

From FIGURE 2 it is evident that no problem exists when the ventilation air is in the low flow range. At high flows, which are required at sea level and generally 300 l.p.m. flow is needed, substantial impairment of the aviator's mobility may exist. Using 300 l.p.m. it is illustrated (curve *a*) that the pressure garment alone creates a 0.2 p.s.i.g. back pressure. It is thus apparent that the pressure drop through the flow control regulator 25 (FIG. 1) must be kept to an absolute minimum in that it is additive to the garment pressure drop.

Based on the above, the garment pressure added by the flow control regulator becomes an important consideration for garment mobility at sea level. The regulators of the prior art and regulator 25 (FIG. 1) without the use of booster pressure creates approximately a 0.15 pressure drop which together with the garment pressure drop results in a garment back pressure of 0.35 p.s.i.g. (see curve *c*) which is excessive for complete mobility of the aviator without the use of additional effort. Advantageously, the flow control regulator 25 (FIG. 1) of the present invention with the use of booster pressure adds only 0.05 p.s.i.g. of back pressure at 300 l.p.m. flow thereby creating a back-up pressure in the suit of 0.25 p.s.i.g. (see curve b).

Flow control regulator 25 of FIG. 1 is shown schematically in FIG. 3 of the drawings. Regulator 25 has a housing 28 having suit mounting flange 29 disposed to receive suit 11. Housing 28 defines air inlets 30 which are open to the interior of the garment 10 (FIG. 1), and air outlets 31 which are open to the atmosphere outside the garment 10 (FIG. 1). Valve chamber 32 is defined by the housing 28 intermediate the inlets 30 and outlets 31 and is in fluid communication therewith. Housing 28 defines a pressure port 34 which is in fluid communication with air inlet check valve 18 (FIG. 1) by means of tubing 26. The pressure tap made by tubing 26 (FIG. 1) is in front of the valve portion of the check valve 18 (FIG. 1). Hereinafter the gas pressure from check valve 18 flowing into tubing 26 (FIG. 1) will be referred to as "booster pressure." The booster pressure is a function of the flow rate of the ventilation air flowing from air supply 16 (FIG. 1) as controlled by manual valve 17.

Intermediate air inlets 30 and pressure port 34 is booster diaphragm 35 disposed to prevent fluid flow therebetween. Diaphragm 35 forms one wall of a booster chamber 36 which opens into port 34. Diaphragm 35 forms one wall of an air inlet chamber 38 which is intermediate air inlet 30 and valve chamber 32. End cap 39 forms a part of housing 28 and defines an aneroid chamber 40 which opens into air outlets 31.

The walls of valve chamber 32 define valve seat 41. Valve head 42 is disposed in aneroid chamber 40 and is biased against valve seat 41 by means of spring 44. Valve stem 45 is connected to valve head 42 and extends through valve chamber 32 and air inlet chamber 38 to be biased against diaphragm 35 which is maintained in an initial position by means of diaphragm support member 46.

Aneroid 48 is disposed in aneroid chamber 40 and mounted in the wall thereof by means of support member 49. Aneroid 48 and valve head 42 are constructed so that aneroid 48 will come in contact with valve stem 45 and maintain valve head 42 against valve seat 41 at a pressure equivalent to 35,000 feet altitude and maintain the pressure in valve chamber 32 at or above 3.4 p.s.i.a., the critical pressure. Advantageously, aneroid 48 has a variable spring rate which decreases as valve head 42 opens and thus the force required to move aneroid 48 and valve head 42 from seat 41 is less than an aneroid which has a constant spring rate.

In operation of the pressure suit and helmet system shown in FIG. 1, oxygen supply 14, in the pressure range of 50–90 p.s.i.g. is connected to the breathing regulator 15 and the ventilation air supply 16 is connected to air inlet check valve 18. When the helmet visor (not shown) is closed, oxygen supply pressure is channeled to visor seal 20 and to respiratory compartment 19 which is pressurized and maintained at one-half inch of water pressure above suit pressure by means of breathing regulator 15. Ventilation air passes through check valve 18, distribution system 24 and the pressure garment 10 and is vented to the atmosphere through flow control regulator 25. Regulator 25 utilizes the pressure that is created at check valve 18 when ventilation air is circulated through the garment 10 to help open the valve head 42 (FIG. 3) in regulator 25. The pressure vs. flow characteristics of the check valve 18 together with the pressure drop through the distribution system 24 permits the valve head 42 (FIG. 3) to be completely open at low air flows through the garment 10. Therefore, the resulting build-up in garment pressure due to the regulator 25 is extremely low since a direct increase in internal suit pressure is not needed to open the valve. Below an altitude of 35,000 feet regulator 25, because of the action of the booster pressure through tubing 26 and acting under diaphragm 35 (FIG. 3), maintains the garment 10 pressure at a minimum while dumping the ventilation air to the atmosphere. Above 35,000 feet aneroid 48 (FIG. 3) in regulator 25 meters the flow of ventilation air from the garment 10 to maintain the garment pressure at 3.4 p.s.i.a.

Ventilation air from air supply 16 is forced through the garment 10 and out of the flow control regulator 25 to the atmosphere. The pressure from air supply 16 must be sufficient to overcome the pressure drop through the check valve 18, through the distribution system 24 and through the flow control regulator 25.

Referring now in particular to the operation of the flow control regulator 25 shown in detail in FIG. 3, the pressure from air supply 16 (FIG. 1) is always greater than the pressure in the garment 10 (FIG. 1) because of the pressure drop through the check valve 18 (FIG. 1) and the distribution system 24 (FIG. 1). A pressure tap from the front of the check valve 18 (FIG. 1) is connected to pressure port 34 and thus the booster pressure exists in booster chamber 36 and acts on one side of diaphragm 35. The second side of diaphragm 35 is acted on by suit pressure which exists in an inlet chamber 38.

In a no-flow condition spring 44 acts on valve head 42 to bias the head 42 against valve seat 41 and diaphragm 35 is in a neutral position.

In a flow condition below an altitude of 35,000 feet, a pressure differential exists across diaphragm 35, booster pressure on one side and suit pressure on the second side. The pressure differential across diaphragm 35 moves the diaphragm 35 against valve stem 45 thereby overcoming the force of spring 44 and thus moving valve head 42 from valve seat 41. A small build-up in garment pressure due to the pressure drop across valve head 42 aids in maintaining the valve head 42 in an open position. Increase in air flow through the garment 10 (FIG. 1) results in an increase in booster pressure in booster chamber 36 until a flow is reached whereby valve head 42 is held completely oepn by means of the action of booster pressure acting on diaphragm 35 only. The resistance to air flow past valve head 42 is substantially negligible in that movement of valve head 42 is dependent on booster pressure and only slightly on internal garment pressure.

In a flow condition above an altitude of 35,000 feet, aneroid 48 is disposed to contact valve head 42 and to meter the flow from the garment. The pressure in valve chamber 32 and thus in garment 10 (FIG. 1) is maintained at 3.4 p.s.i.a. at all altitudes above 35,000 feet. As heretofore described, aneroid 48 has a variable spring rate. This characteristic combined with the utilization of the booster pressure provides regulator 25 with a good pressure vs. flow performance while maintaining suit pressure at 3.4 p.s.i.a.

While the fluid control apparatus as shown in the drawing are of the construction shown and described, it is understood that the present invention is not limited to any particular form or construction. Moreover, other changes and modifications of the novel fluid control apparatus may be made by those skilled in the art without departing from the scope of the present invention.

I claim:

1. A garment pressure regulator for a garment of the kind to which ventilation gas is supplied at a variable rate comprising, a housing for attachment to said garment and forming a flowpath defining communication between the interior of said garment and the surrounding atmosphere, a valve normally closing said flowpath, means for opening said valve comprising actuating means sensitive to the differential between pressure of said garment pressure and a booster pressure, and booster pressure applying means for applying to said actuating means said booster pressure which booster pressure increases with ventilation gas flow rate.

2. A garment pressure regulator for a garment and ventilation gas source of the type in which pressurized ventilation gas is introduced via a conduit containing a check valve and is exhausted from said garment via an exit opening comprising, a valve for disposition in said exit opening, an actuator for said valve sensitive to the differential of pressures to which it is subjected, and means for subjecting said actuator to the differential of a pressure having the pressure of said ventilation gas upstream of said check valve and the pressure of said garment.

3. An air flow regulator for controlling the air flow through an aviator's pressure garment and maintaining the garment pressure at not less than the physiological critical pressure comprising a flow passage, a valve seat, said flow passage having one end disposed for communication with said aviator's pressure garment and the second end terminating in said valve seat and opening to the atmosphere exterior of said garment, a spring, flow control valve means biased against said seat by said spring and disposed for varying the opening of said second end of said flow passage, a gas chamber, a resilient diaphragm disposed across the interior of said gas chamber dividing said chamber into two chambers and movable in response to variations in the pressure differential in the chambers, means arranged to maintain the gas pressure entering said aviator's pressure garment in one of said chambers, means arranged to maintain garment pressure in the second of said chambers, a valve stem connected to said flow control valve means and biased against said resilient diaphragm by means of said spring and aneroid means responsive to variations in ambient pressure and disposed for movement against said flow control valve means to maintain the gas pressure in said flow passage at a pressure inversely variable with altitude but never less than said critical pressure.

4. The combination comprising an aviator's pressure garment having a ventilation air inlet and a ventilation air outlet and an air flow regulator means disposed in said ventilation air outlet for controlling the air flow through said garment and maintaining the pressure in said garment at not less than the physiological critical pressure comprising a flow passage, a valve seat, a valve head, and a compression spring, said flow passage having one end in communication with said aviator's pressure garment and the second end terminating in said valve seat and opening to the atmosphere exterior of said garment, said valve head biased against said valve seat by means of said spring and disposed for varying the opening of said second end of said flow passage, a gas chamber and a resilient diaphragm, said diaphragm disposed across the interior of said gas chamber dividing said chamber into two chambers and disposed for movement in response to variations in the pressure differential in the chambers, means arranged to maintain the gas pressure at said ventilation air inlet in one of said chambers and means arranged to maintain the gas pressure at said ventilation air outlet in the second of said chambers, a valve stem connected to said valve head and biased against said resilient diaphragm by means of said spring and aneroid means responsive to variations in ambient pressure and disposed for movement against said flow control valve means to maintain the gas pressure in said flow passage at a pressure inversely variable with altitude but never less than said critical pressure.

References Cited by the Examiner
UNITED STATES PATENTS

| | | | |
|---|---|---|---|
| 2,929,377 | 3/60 | Cummins | 128—144 |
| 2,963,034 | 12/60 | Cummins | 137—81 X |
| 3,019,804 | 2/62 | Miller | 137—81 X |
| 3,103,927 | 9/63 | Henneman et al. | 128—144 |

LAVERNE D. GEIGER, *Primary Examiner.*

MILTON KAUFMAN, *Examiner.*